(12) United States Patent
Ayukawa

(10) Patent No.: US 11,027,780 B2
(45) Date of Patent: Jun. 8, 2021

(54) VEHICLE FRONT PORTION STRUCTURE

(71) Applicant: Toyota Jidosha Kabushiki Kaisha, Toyota Aichi-ken (JP)

(72) Inventor: Tatsuya Ayukawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 16/528,999

(22) Filed: Aug. 1, 2019

(65) Prior Publication Data

US 2020/0047810 A1 Feb. 13, 2020

(30) Foreign Application Priority Data

Aug. 7, 2018 (JP) .............................. JP2018-148811

(51) Int. Cl.

| B60J 7/00 | (2006.01) |
|---|---|
| B62D 21/15 | (2006.01) |
| B21C 23/00 | (2006.01) |
| B62D 25/02 | (2006.01) |
| B62D 25/14 | (2006.01) |
| B62D 29/00 | (2006.01) |

(52) U.S. Cl.
CPC .......... *B62D 21/152* (2013.01); *B21C 23/002* (2013.01); *B62D 25/025* (2013.01); *B62D 25/145* (2013.01); *B62D 29/008* (2013.01)

(58) Field of Classification Search
CPC ........ A47B 96/021; B65D 2543/00629; B65D 2543/00685; B65D 2543/00796; B65H 2701/31; H01L 2924/00014; H01L 2924/00; H05K 13/0417; C07C 5/2775; F16D 31/02
See application file for complete search history.

(56) References Cited

U.S. PATENT DOCUMENTS

| 3,881,742 A | * | 5/1975 | Felzer | ..................... B60R 19/00 |
|---|---|---|---|---|
| | | | | 280/784 |
| 5,562,329 A | * | 10/1996 | Srock | ................... B62D 25/082 |
| | | | | 296/203.01 |
| 6,102,466 A | * | 8/2000 | Kanazawa | ............. B60N 3/066 |
| | | | | 296/75 |
| 6,179,372 B1 | | 1/2001 | Sakamoto et al. | |
| 6,688,676 B1 | | 2/2004 | Sato | |

(Continued)

FOREIGN PATENT DOCUMENTS

JP 2001-225766 A 8/2001

*Primary Examiner* — Kiran B Patel
(74) *Attorney, Agent, or Firm* — Dinsmore & Shohl LLP

(57) ABSTRACT

A reinforcing plate is provided between an inner central portion that structures a portion of a connecting member and a rear end portion of a dash cross-member. The reinforcing plate is a wrought member and is joined (at a join portion) to both the inner central portion and a rear wall portion of the dash cross-member via joining members. Because the wrought member has high tensile strength, when the reinforcing plate is provided at the join portion of the connecting member, a tensile load acting on the join portion may be borne by the reinforcing plate, and breakage of the connecting member may be suppressed. Therefore, an impact load transmitted from a front side member through the connecting member may be transmitted to the dash cross-member and rockers.

12 Claims, 12 Drawing Sheets

(56) References Cited

U.S. PATENT DOCUMENTS

| | | | | |
|---|---|---|---|---|
| 7,104,596 B2* | 9/2006 | Goto | ................ | B62D 25/2018 |
| | | | | 296/187.08 |
| 7,810,878 B2* | 10/2010 | Nakamura | ............ | B62D 21/11 |
| | | | | 296/203.02 |
| 9,296,426 B2* | 3/2016 | Delord | ............... | B62D 25/2018 |
| 10,358,168 B2* | 7/2019 | Atsumi | ................ | B62D 23/005 |
| 2009/0102236 A1* | 4/2009 | List | ........................ | B62D 25/08 |
| | | | | 296/187.09 |
| 2015/0145283 A1* | 5/2015 | Nishino | ............... | B62D 25/145 |
| | | | | 296/187.1 |
| 2015/0145284 A1* | 5/2015 | Nishida | ............. | B62D 25/2036 |
| | | | | 296/187.1 |
| 2016/0001817 A1 | 1/2016 | Atsumi et al. | | |
| 2017/0096170 A1* | 4/2017 | Sasaki | ................. | B62D 21/155 |
| 2018/0065676 A1 | 3/2018 | Yoshida et al. | | |
| 2018/0126835 A1* | 5/2018 | Saeki | .................... | B62D 21/02 |
| 2018/0265134 A1* | 9/2018 | Tomiki | ................ | B62D 21/152 |
| 2018/0312198 A1* | 11/2018 | Shimizu | ................ | B62D 21/11 |
| 2018/0361857 A1* | 12/2018 | Shimizu | .................. | B60L 50/64 |
| 2019/0002026 A1* | 1/2019 | Ayukawa | ............. | B62D 21/155 |
| 2019/0016388 A1* | 1/2019 | Shimizu | ................ | B62D 21/152 |
| 2019/0023321 A1* | 1/2019 | Ayukawa | ............... | B62D 21/03 |
| 2019/0031240 A1* | 1/2019 | Uehata | ................ | B62D 25/088 |
| 2019/0092396 A1* | 3/2019 | Abe | ....................... | B62D 25/20 |
| 2019/0144038 A1* | 5/2019 | Takahashi | ............ | B62D 27/023 |
| | | | | 296/193.07 |
| 2019/0329824 A1* | 10/2019 | Grattan | ................ | B62D 25/082 |
| 2020/0070897 A1* | 3/2020 | Xiao | ................ | B62D 25/2027 |
| 2020/0108871 A1* | 4/2020 | Sakurai | ................ | B62D 21/152 |
| 2020/0130495 A1* | 4/2020 | Shimizu | ............ | B62D 25/2036 |
| 2020/0180702 A1* | 6/2020 | Murata | ................ | B62D 29/00 |
| 2020/0180704 A1* | 6/2020 | Murata | ................ | B62D 27/023 |
| 2020/0231213 A1* | 7/2020 | Murata | ................ | B62D 21/08 |
| 2020/0231217 A1* | 7/2020 | Murata | ................ | B62D 25/08 |
| 2020/0231223 A1* | 7/2020 | Kagami | ................ | B62D 25/02 |
| 2020/0239080 A1* | 7/2020 | Kagami | ............ | B62D 25/2027 |
| 2020/0283068 A1* | 9/2020 | Murai | ................ | B62D 21/152 |

\* cited by examiner

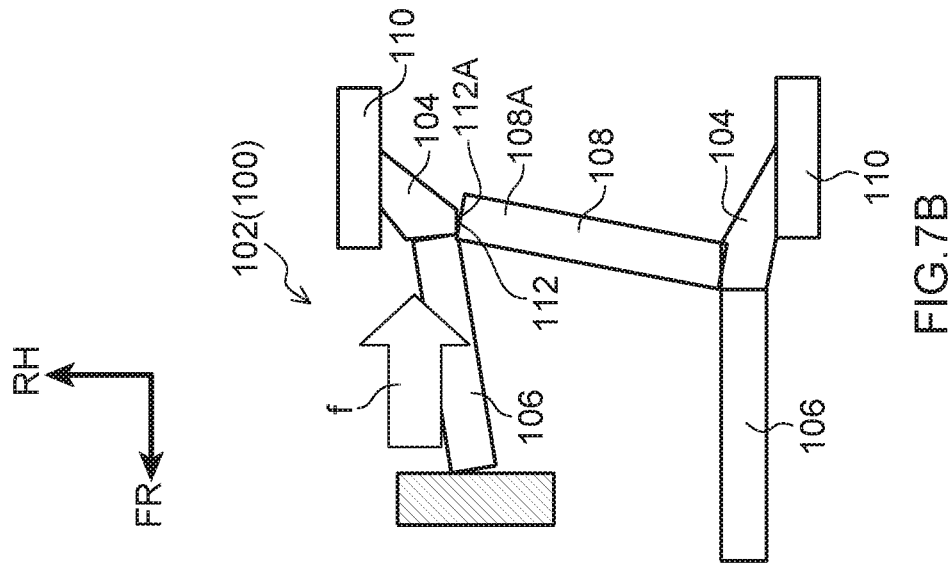
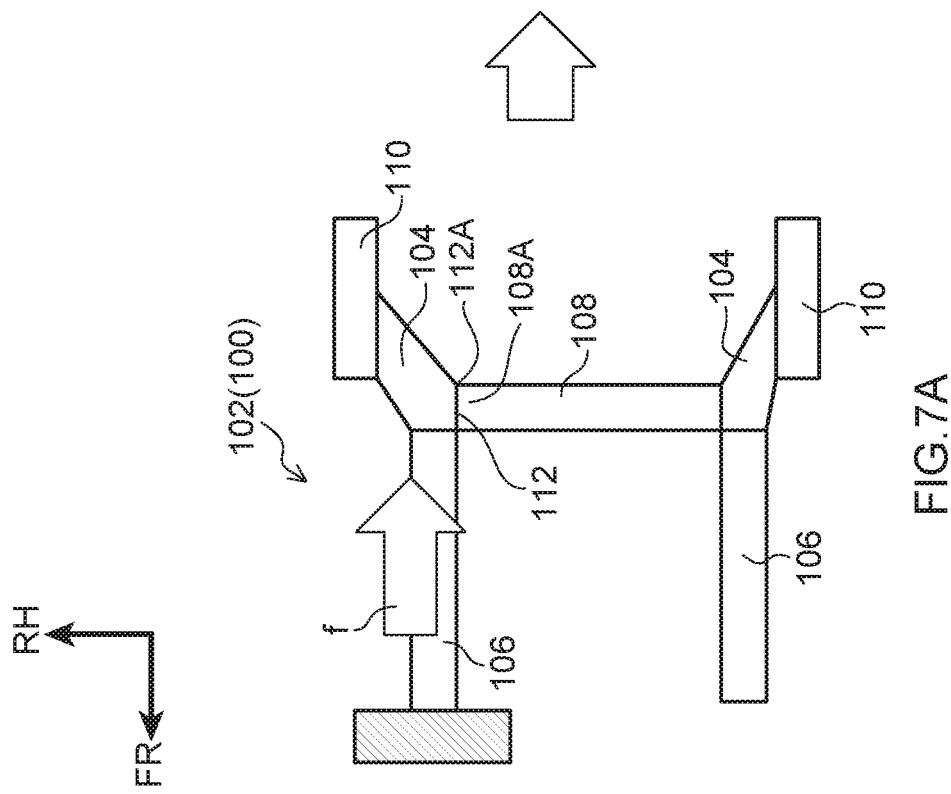

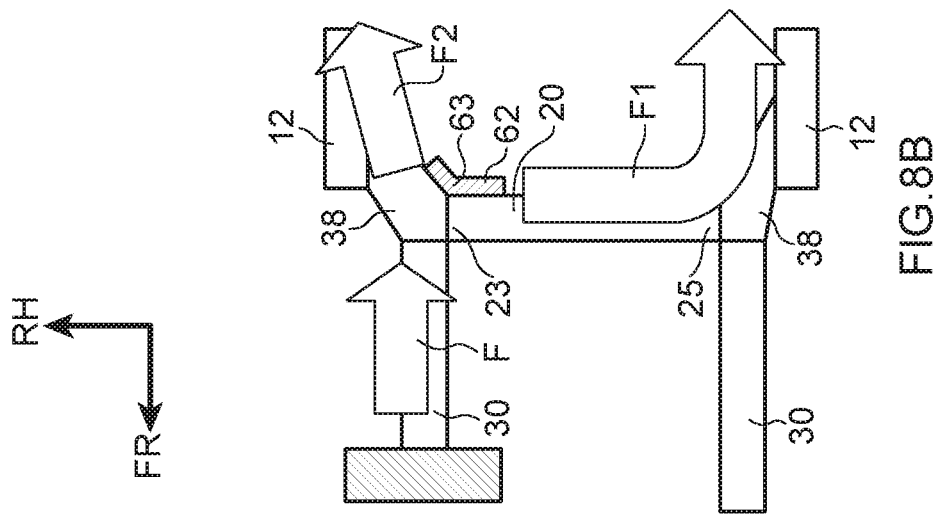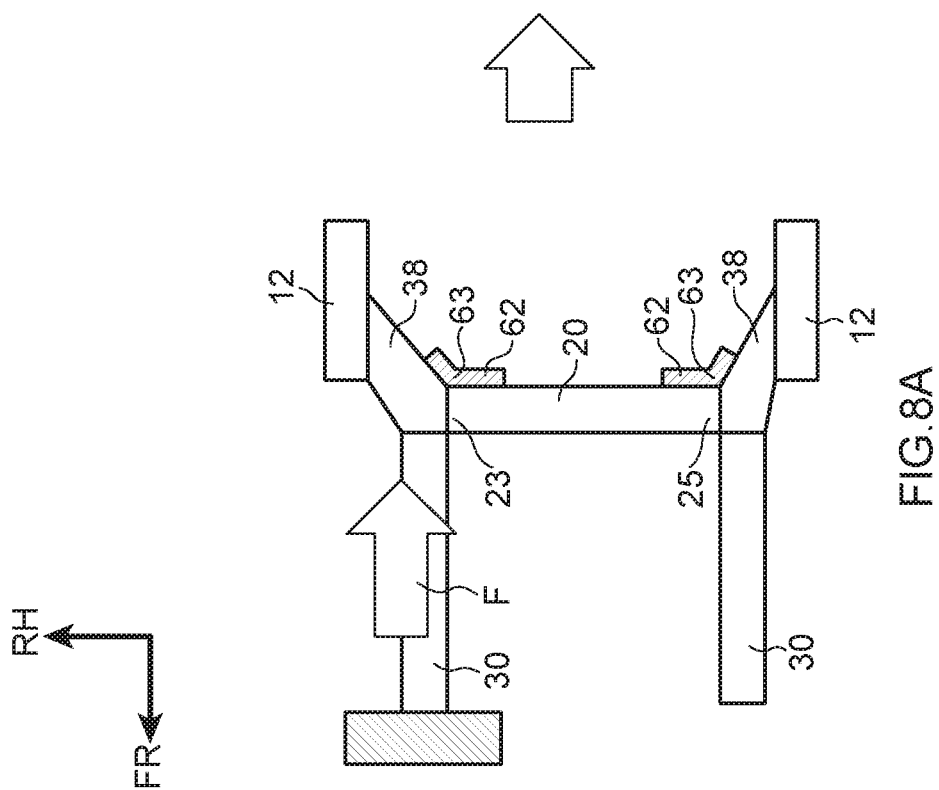

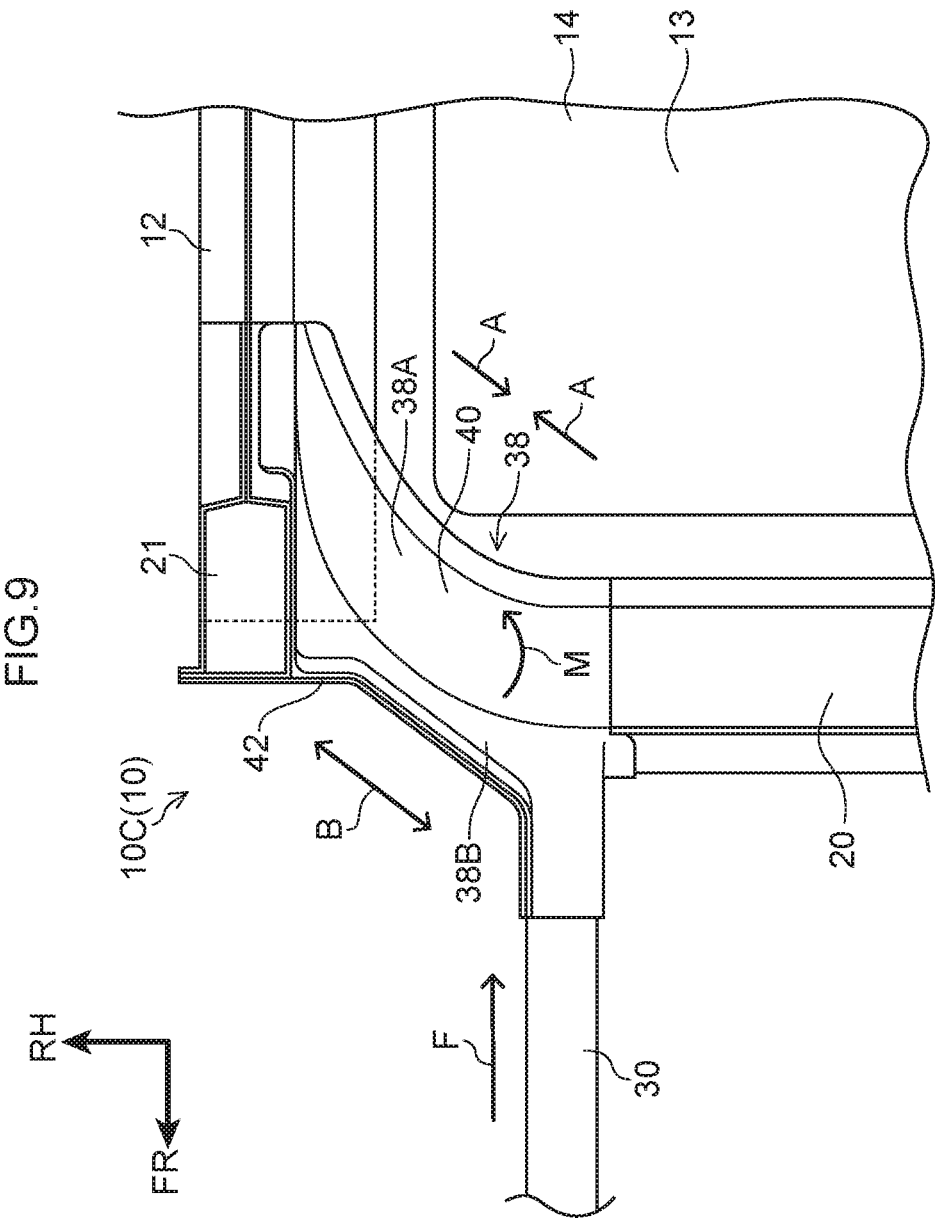

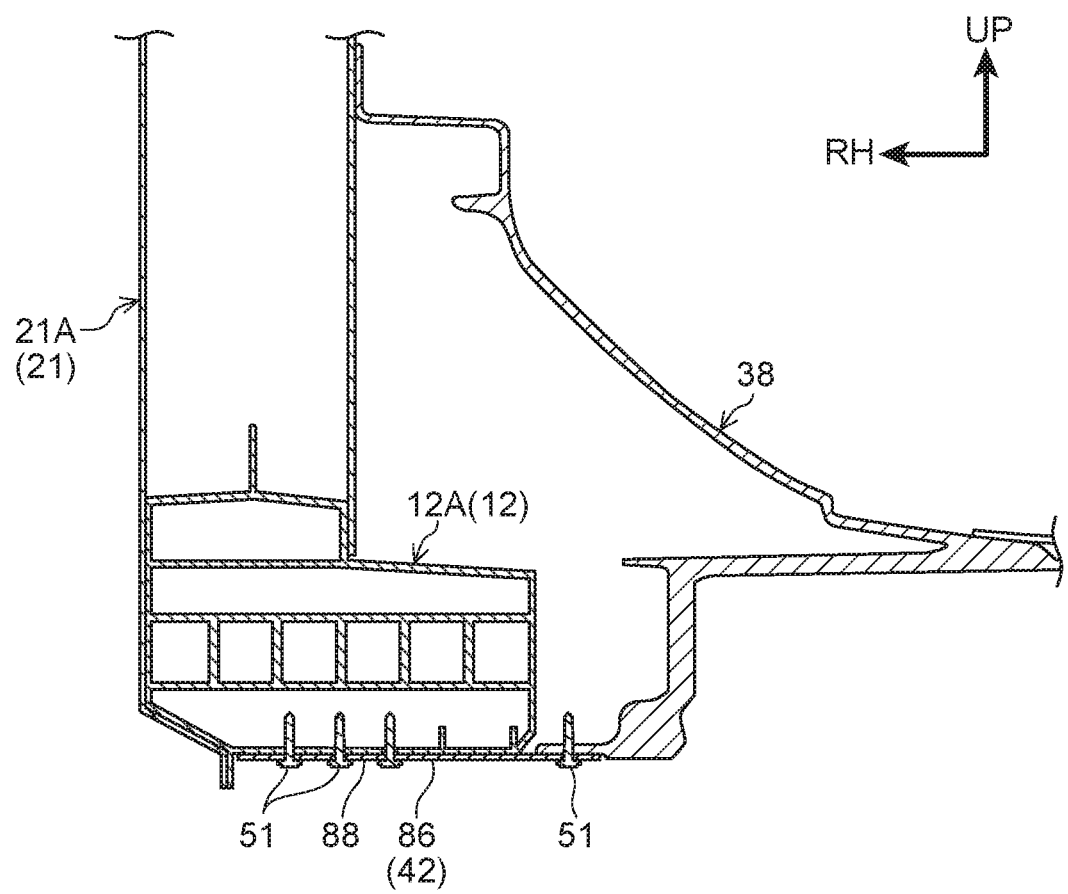

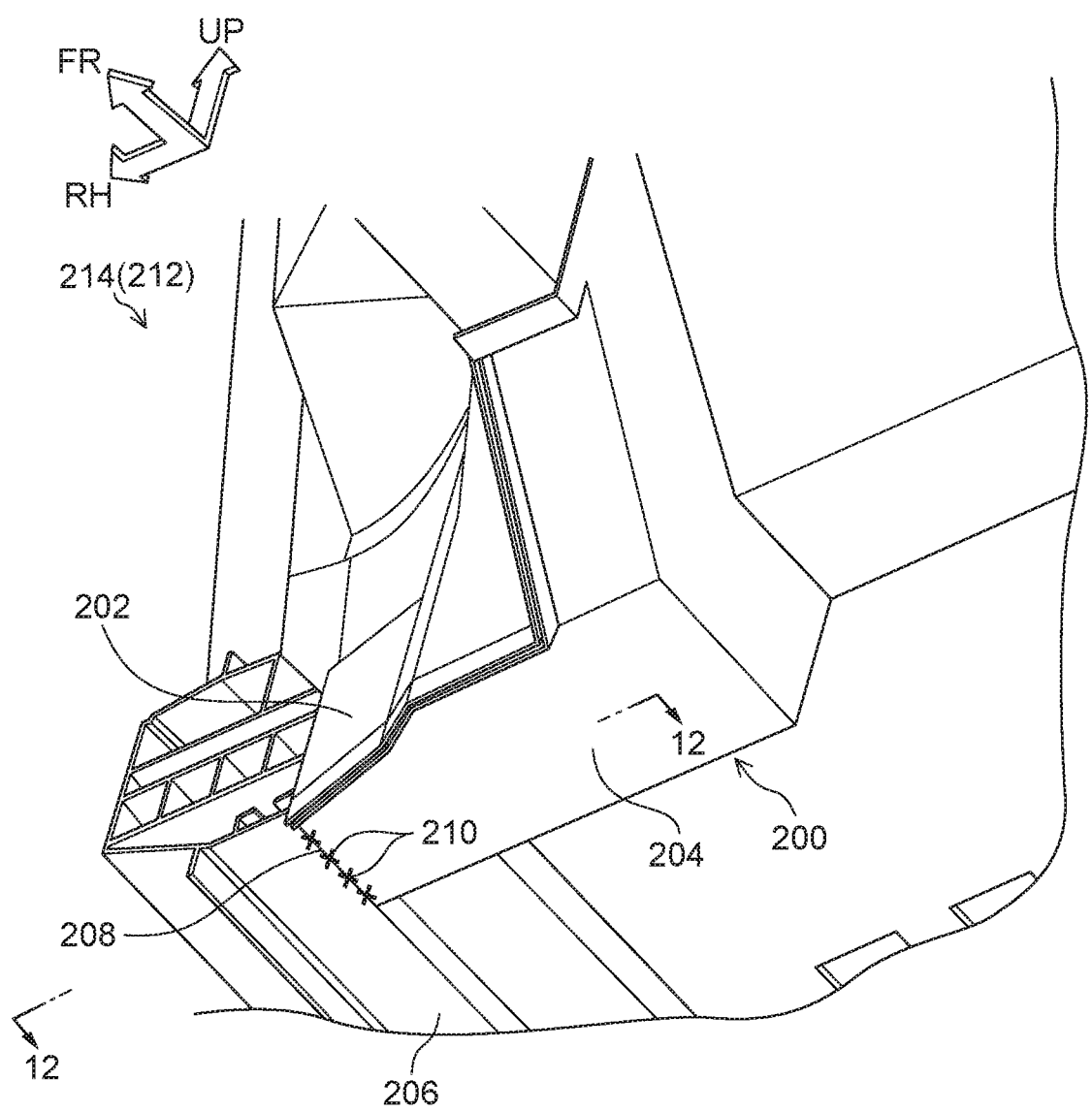

VEHICLE FRONT PORTION STRUCTURE

CROSS-REFERENCE TO RELATED APPLICATION

This application is based on and claims priority under 35 USC 119 from Japanese Patent Application No. 2018-148811 filed on Aug. 7, 2018, the disclosure of which is incorporated by reference herein.

BACKGROUND

Technical Field

The present disclosure relates to a vehicle front portion structure.

Related Art

Japanese Patent Application Laid-Open (JP-A) No. 2001-225766 (Patent Document 1) discloses a technology in which a reinforcing member is provided between a dash cross-member and a floor panel. In this related art, an impact load that is applied to the dash cross-member from a front side member is transmitted through the reinforcing member to a floor tunnel, a side sill (below referred to as a rocker) and the like.

Technologies in which a front side member, dash cross-member and rocker are linked by a connecting member fabricated by die-casting have been considered. Typically, a member fabricated by die-casting (below referred to as a cast member) is strong with respect to compressive loads but weak with respect to tensile loads. Therefore, when an impact load is applied to the front side member, if a load in a tension direction acts on the connecting member formed of a cast member, the connecting member may break. There is scope for improvement of these technologies in this respect.

SUMMARY

In consideration of the circumstances described above, an object of the present disclosure is to provide a vehicle front portion structure that may suppress breakage of a connecting member and transmit an impact load transmitted from a front side member to a dash cross-member and a rocker.

A vehicle front portion structure according to a first aspect includes: a front side member that extends in a vehicle front-and-rear direction at a front portion of the vehicle; a dash cross-member that extends in a vehicle width direction at the vehicle rear side of the front side member; a rocker that extends in the vehicle front-and-rear direction at the vehicle rear side and a vehicle width direction outer side of the front side member; a connecting member that is joined to the front side member, the dash cross-member and the rocker, at least a portion of the connecting member being formed of a cast member; and a reinforcing portion that is provided at a region of the connecting member at which a tensile load acts when an impact load is transmitted from the front side member to the connecting member during a front collision of the vehicle, the reinforcing portion reinforcing this region.

In the vehicle front portion structure according to the first aspect, the front side member extends in the vehicle front-and-rear direction in the front portion of the vehicle. The dash cross-member that extends in the vehicle width direction is provided at the vehicle rear side of the front side member. The rocker extends in the vehicle front-and-rear direction at the corresponding vehicle width direction outer side of the vehicle rear side of the front side member.

In the present disclosure, the front side member, the dash cross-member and the rocker are linked via the connecting member. At least a portion of the connecting member is formed of a cast member. The reinforcing portion is provided at the region of the connecting member on which a tensile load acts when an impact load is transmitted from the front side member during a front collision of the vehicle (below referred to as a vehicle front collision). The reinforcing portion reinforces this region.

Generally speaking, fabrication methods using aluminium alloys include extrusion molding, press working, die-casting, and so forth. A member formed by extrusion molding or press working is referred to as a wrought member, and a member formed by die-casting referred to as a cast member. The use of a cast member for the connecting member can be expected with a view to high flexibility of shaping, ease of joining to other members, and so forth. However, with a cast member, due to the effect of blowholes formed during casting, extension is not allowed when a tension load is applied and a strain amount before breakage is small. In other words, the tensile strength is low. Therefore, a cast member has a low withstand load with respect to tensile loads.

In light of this point, in the present disclosure as described above, the reinforcing portion that reinforces the region on which a tensile load acts during a vehicle front collision is provided at this region of the connecting member, of which at least a portion is formed of a cast member. Therefore, in the present disclosure, the region of the connecting member on which a tensile load acts during a vehicle front collision is reinforced by the reinforcing portion, and breakage during a vehicle front collision may be suppressed. Therefore, an impact load transmitted from the front side member may be transmitted through the connecting member to the dash cross-member, rocker and the like.

The meaning of the term "during a vehicle front collision" as used herein is intended to include, beside full overlap collisions, which are full frontal collisions, at least one of small overlap collisions, which are impacts against positions that are offset to one side in the vehicle width direction, and oblique collisions, which are impacts from diagonally in front of the vehicle. The meaning of the term "of which at least a portion is formed of a cast member" applied to the connecting member is intended to include, beside the connecting member being formed by a single member, the connecting member being formed by plural members. For example, if the connecting member is formed by a single member, the connecting member is entirely formed of a cast member, and if the connecting member is formed by two members, at least one of the two members is formed of a cast member.

In a vehicle front portion structure according to a second aspect, in the vehicle front portion structure according to the first aspect, the reinforcing portion includes a reinforcing member that is disposed at the vehicle rear side of a join portion at which the connecting member is joined to the dash cross-member, the reinforcing member being formed of a wrought member.

The front side member extends in the vehicle front-and-rear direction, and the dash cross-member extends in the vehicle width direction. Therefore, when an impact load is transmitted from the front side member to the connecting member during a vehicle front collision, the impact load is transmitted through the connecting member to a length direction end portion side of the dash cross-member disposed at the vehicle rear side of the front side member.

Because the connecting member is also joined to the rocker, a tensile load acts, via the length direction end portion side of the dash cross-member, on the vehicle rear side of the join portion at which the connecting member is joined to the dash cross-member.

Accordingly, as the reinforcing member of the vehicle front portion structure according to the second aspect, a reinforcing member formed of a wrought member is disposed at the vehicle rear side of the join portion at which the connecting member and the dash cross-member are joined. Because the wrought member has a high tensile strength, breakage of the connecting member may be suppressed in the present disclosure by a portion of a tensile load acting on the connecting member being borne by the reinforcing member.

In a vehicle front portion structure according to a third aspect, in the vehicle front portion structure according to the first aspect or the second aspect, the connecting member includes: an inner portion that includes a vehicle front-and-rear direction rear portion of the connecting member; and an outer portion that includes a vehicle front-and-rear direction front portion of the connecting member, the outer portion being joined to the inner portion.

In the vehicle front portion structure according to the third aspect, the connecting member includes the inner portion and the outer portion. Consequently, in the present disclosure, freedom of design may be broadened compared to a case in which the connecting member is formed by a single member.

In a vehicle front portion structure according to a fourth aspect, in the vehicle front portion structure according to the third aspect, the reinforcing portion includes the outer portion, the outer portion being formed of a wrought member.

Because a wrought member has a high tensile strength, the tensile strength of the connecting member may be raised compared to, for example, a structure in which an inner portion and outer portion constituting the connecting member are formed of cast members, by forming at least the outer portion of a wrought member. As described above, the rocker extends in the vehicle front-and-rear direction at the vehicle rear side and vehicle width direction outer side of the front side member. Therefore, when an impact load is transmitted from the front side member to the connecting member during a vehicle front collision, a bending moment in a horizontal direction acts on the connecting member that is joined to the front side member and the rocker. At this time, compressive stress acts on a rear portion (in the vehicle front-and-rear direction) of the connecting member, and tensile stress acts on a front portion (in the vehicle front-and-rear direction) of the connecting member.

In the vehicle front portion structure according to the third aspect described above, the inner portion that is provided includes the rear portion of the connecting member, and the outer portion that is provided includes the front portion of the connecting member. Consequently, the compressive stress acts on the inner portion and the tensile stress acts on the outer portion.

In light of this point, in the vehicle front portion structure according to the fourth aspect, the outer portion is formed of the wrought member. Therefore, in the present disclosure, breakage of the connecting member may be suppressed, and an impact load transmitted from the front side member may be transmitted through the connecting member to the dash cross-member, rocker and the like.

In a vehicle front portion structure according to a fifth aspect, in the vehicle front portion structure according to the fourth aspect, the outer portion is joined to the rocker, and the reinforcing portion includes a first superposed portion that is formed at a lower end portion of the outer portion, is bent back toward the vehicle front-and-rear direction rear side along a lower wall portion of the rocker, and is joined to the rocker via a joining member.

For example, the outer portion formed of the wrought member is abutted (at an abutting portion) against the inner portion or an alternative member and the abutting portion is welded (a welded portion). In this structure, if the welded portion detaches (breaks) while a tensile load is acting on the connecting member, the connecting member may be unable to transmit an impact load to other members.

Accordingly, in the vehicle front portion structure according to the fifth aspect, the first superposed portion at the lower end portion of the outer portion is bent back toward the rear side in the vehicle front-and-rear direction along the lower wall portion of the rocker, and the first superposed portion is joined to the lower wall portion of the rocker via the joining member. Because this first superposed portion is formed, a portion of a tensile load acting on the connecting member may be borne by the first superposed portion. Therefore, in the present disclosure, breakage due to detachment of the join portion between the outer portion of the connecting member and the rocker may be suppressed, and an impact load transmitted to the connecting member may be transmitted to the rocker.

In a vehicle front portion structure according to a sixth aspect, in the vehicle front portion structure according to the fourth aspect or the fifth aspect, the inner portion is joined to the front side member and the dash cross-member, and the reinforcing portion includes a second superposed portion that is formed at a lower end portion of the outer portion, is bent back toward the vehicle front-and-rear direction rear side along a lower wall portion of the inner portion joined to the front side member and the dash cross-member, and is joined to the inner portion via a joining member.

Similarly to the vehicle front portion structure according to the fifth aspect described above, in the vehicle front portion structure according to the sixth aspect, the second superposed portion is formed at the lower end portion of the outer portion and is folded back toward the rear side in the vehicle front-and-rear direction along the lower wall portion of the inner portion that is joined to the front side member and the dash cross-member, and the second superposed portion is joined to the lower end portion of the inner portion via the joining member. Thus, because the second superposed portion is formed, a portion of a tensile load acting on the connecting member may be borne by the second superposed portion. Therefore, in the present disclosure, breakage of the connecting member due to detachment of the join portion between the outer portion and the inner portion may be suppressed, and an impact load transmitted to the connecting member may be transmitted to the dash cross-member, the rocker and the like.

The vehicle front portion structure according to the present disclosure provides excellent effects in that breakage of the connecting member may be suppressed and an impact load transmitted from the front side member may be transmitted to the dash cross-member, the rocker and the like.

BRIEF DESCRIPTION OF DRAWINGS

FIG. 7A is an operation description diagram schematically showing a front portion of a vehicle body that serves as a comparative example, which is a plan view showing a state prior to a collision.

FIG. 7B is an operation description diagram schematically showing the front portion of the vehicle body that serves as the comparative example, which is a plan view showing a state during the collision.

FIG. 8A is an operation description diagram schematically showing the front portion of the vehicle in which the vehicle front portion structure according to the present exemplary embodiment is employed, which is a plan view showing a state prior to a collision.

FIG. 8B is an operation description diagram schematically showing the front portion of the vehicle in which the vehicle front portion structure according to the present exemplary embodiment is employed, which is a plan view showing a state during the collision.

FIG. 9 is a plan view schematically showing the front portion of the vehicle in which the vehicle front portion structure according to the present exemplary embodiment is employed.

FIG. 10 is a sectional diagram showing a rocker, a connecting member and the like cut along line 10-10 in FIG. 4.

FIG. 11 is a perspective view, viewed diagonally from the front-left side of the lower side, of a front portion of a vehicle that serves as a comparative example.

DETAILED DESCRIPTION

Figure 1:
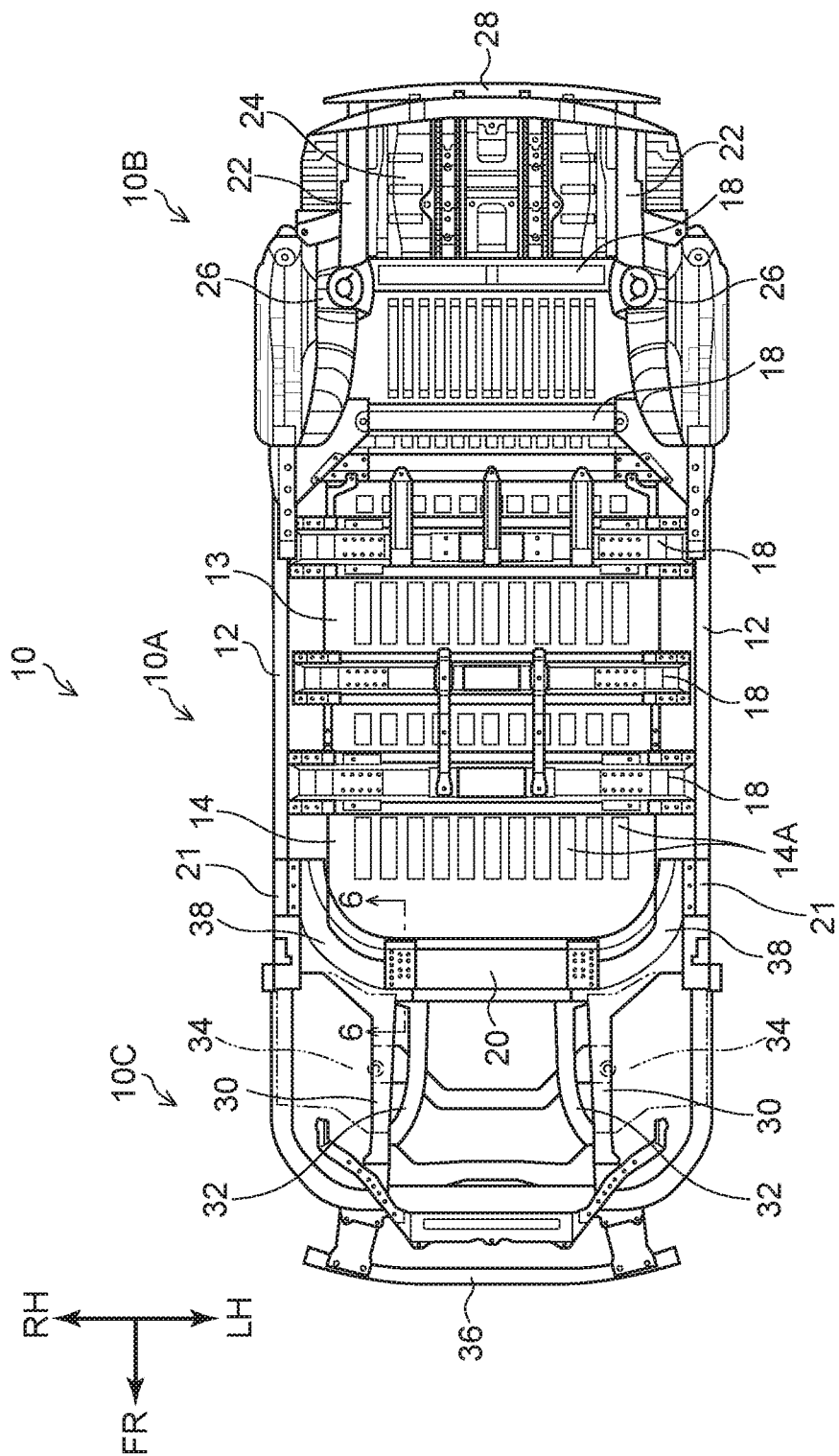
FIG. 1 is a plan view showing a vehicle in which a vehicle front portion structure according to a present exemplary embodiment is employed.

Below, a vehicle front portion structure according to an exemplary embodiment of the present disclosure is described using the attached drawings. Herein, the arrow FR that is shown where appropriate in the drawings indicates a vehicle front-and-rear direction front side, the arrow UP indicates a vehicle vertical direction upper side, an arrow RH indicates a vehicle width direction right side, and an arrow LH indicates the vehicle width direction left side. Hereinafter, where descriptions are given simply using the directions front and rear, left and right, and upper and lower, unless specifically stated otherwise, these indicate front and rear in the vehicle front-and-rear direction, left and right in the vehicle left-and-right direction (the vehicle width direction), and upper and lower in the vehicle vertical direction.

—Structures of the Vehicle Front Portion Structure—

First, structures of the vehicle front portion structure according to the present exemplary embodiment are described.

FIG. 1 shows a vehicle body (a vehicle) 10 in which the vehicle front portion structure according to the present exemplary embodiment is employed.

As shown in FIG. 1, a left and right pair of rockers 12 are provided at a front-and-rear direction middle region 10A of the vehicle body 10. The rockers 12 are disposed apart in the left-and-right direction and extend in the front-and-rear direction. Each rocker 12 is formed in a chamber shape in a sectional view cut along directions orthogonal to the length direction thereof (the vertical and left-and-right directions). The rockers 12 constitute portions of frameworks of two side portions of the vehicle body 10. A floor panel 14 structures a floor surface of a passenger compartment (cabin) 13. Two left-and-right direction end portions of the floor panel 14 are joined to the respective left and right rockers 12.

A region of the floor panel 14 between the left and right rockers 12 is formed in a flat shape, without a tunnel portion for avoiding a driveshaft, an exhaust pipe and the like being formed in the floor panel 14. In order to assure stiffness, plural beads 14A are formed on the floor panel 14 between the left and right rockers 12. Equipment, which is a battery (not shown in the drawings), is mounted at the lower side of the floor panel 14.

Plural cross-members 18 span across the floor panel 14 between the left and right rockers 12 in the left-and-right direction. Both of left-and-right direction end portions of each cross-member 18 are connected to the respective left and right rockers 12. A dash cross-member 20 spans in the left-and-right direction at the front end of the floor panel 14.

Figure 2:
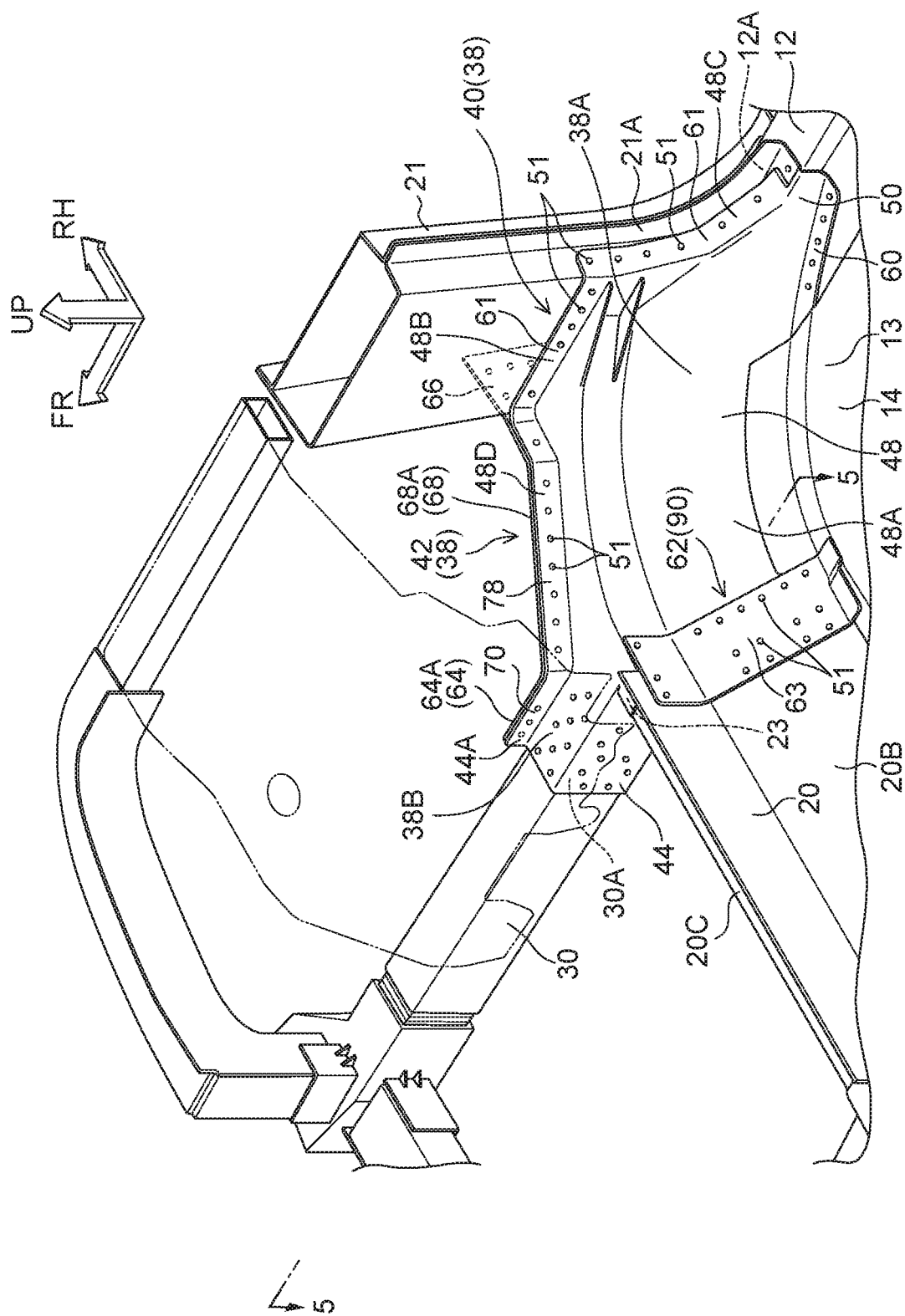
FIG. 2 is a perspective view, viewed diagonally from the rear-left side of the upper side, of a front portion of the vehicle in which the vehicle front portion structure according to the present exemplary embodiment is employed.
Figure 3:
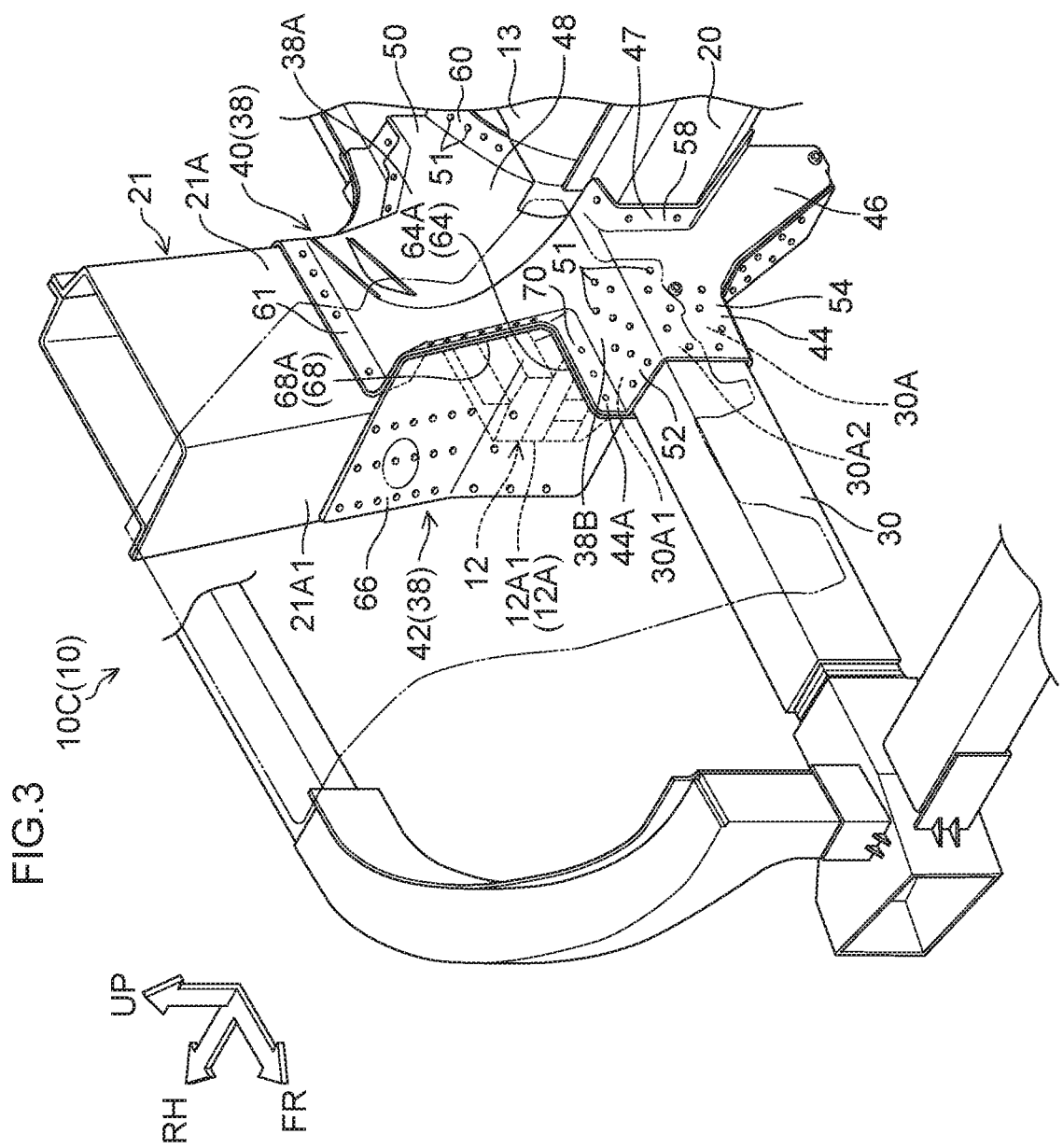
FIG. 3 is a perspective view, viewed diagonally from the front-left side of the upper side, of the front portion of the vehicle in which the vehicle front portion structure according to the present exemplary embodiment is employed.

As shown in FIG. 2 and FIG. 3, at each of the left and right rockers 12, a lower portion 21A of a front pillar 21 that extends in the vehicle vertical direction is joined to a front end portion 12A of the rocker 12. FIG. 2 depicts a perspective view in which a front portion 10C of the vehicle body 10, which is described below, is viewed diagonally from the rear-left side of the upper side thereof. FIG. 3 depicts a perspective view in which the front portion 10C of the vehicle body 10 is viewed diagonally from the front-left side.

As shown in FIG. 1, a left and right pair of rear side members 22 are provided at a rear portion 10B of the vehicle body 10. The rear side members 22 are disposed at inner sides relative to the left and right rockers 12, are disposed apart in the left-and-right direction, and extend in the front-and-rear direction. Each rear side member 22 is formed in a chamber shape in a sectional view cut along directions orthogonal to the length direction thereof (the vertical and left-and-right directions). The rear side members 22 constitute portions of a framework of the rear portion 10B of the vehicle body 10.

A rear panel 24 structures a floor surface of a luggage compartment. Two left-and-right direction end portions of the rear panel 24 are joined to the respective left and right rear side members 22. One of the cross-members 18 spans between the left and right rear side members 22. The two left-and-right direction end portions of this cross-member 18 are joined to the respective left and right rear side members 22. Rear suspension towers 26 are joined to the left and right rear side members 22. The rear suspension towers 26 support portions of rear suspensions, which are not shown in the drawings. A rear bumper reinforcement 28 is attached to rear end portions of the left and right rear side members 22.

A left and right pair of front side members 30 are provided at the front portion 10C of the vehicle body 10. The front side members 30 are disposed at inner sides relative to the left and right rockers 12, are disposed apart in the left-and-right direction, and extend in the front-and-rear direction. Each front side member 30 is formed in a chamber shape with a rectangular shape in a sectional view cut along the vehicle width direction. The front side members 30 constitute portions of a framework of the front portion 10C of the vehicle body 10.

Suspension members 32 that support lower arms and the like, which are not shown in the drawings, are attached to the left and right pair of front side members 30. Front suspension towers 34, which support portions of front suspensions, are also joined to the left and right pair of front side members 30. A front bumper reinforcement 36 is attached to front end portions of the left and right front side members 30. Rear end portions of the left and right front side members 30 are joined to the dash cross-member 20.

In the present exemplary embodiment, as an example, the front side members 30, the dash cross-member 20 and the rockers 12 are formed by extrusion molding of aluminium alloy materials. These framework members are linked with one another via front side member rears (below referred to as connecting members) 38.

—Connecting Member—

The connecting members 38 are described below. The connecting member 38 at the right side and the connecting member 38 at the left side have structures that are symmetrical in the vehicle width direction. Accordingly, the connecting member 38 at the right side is described below; descriptions of the connecting member 38 at the left side are not given.

As shown in FIG. 2 and FIG. 3, the connecting member 38 includes an inner member (inner portion) 40 and an outer member (outer portion) 42. The inner member 40 includes a rear portion 38A of the connecting member 38 and is disposed at the inner side in the vehicle width direction. The outer member 42 includes a front portion 38B of the connecting member 38 and is disposed at the outer side in the vehicle width direction. The inner member 40 and outer member 42 are joined to one another (described below).

The inner member 40 is joined to the front side member 30, the dash cross-member 20, the front pillar 21, the floor panel 14 and the rocker 12. The outer member 42 is joined to the front side member 30, the front pillar 21 and the rocker 12. The meaning of the term "joined" as used herein is intended to include joining by flow drill screws (FDS), fastening with bolts and nuts, bonding by welding or the like, adhesion by an adhesive or the like, and so forth.

—Inner Member—

The inner member 40 shown in FIG. 2 and FIG. 3 is a cast member of an aluminium alloy that is integrally formed by die-casting. The inner member 40 includes an inner front portion 44, an inner lower portion 46, an inner middle portion 48 and an inner rear portion 50.

Figure 4:
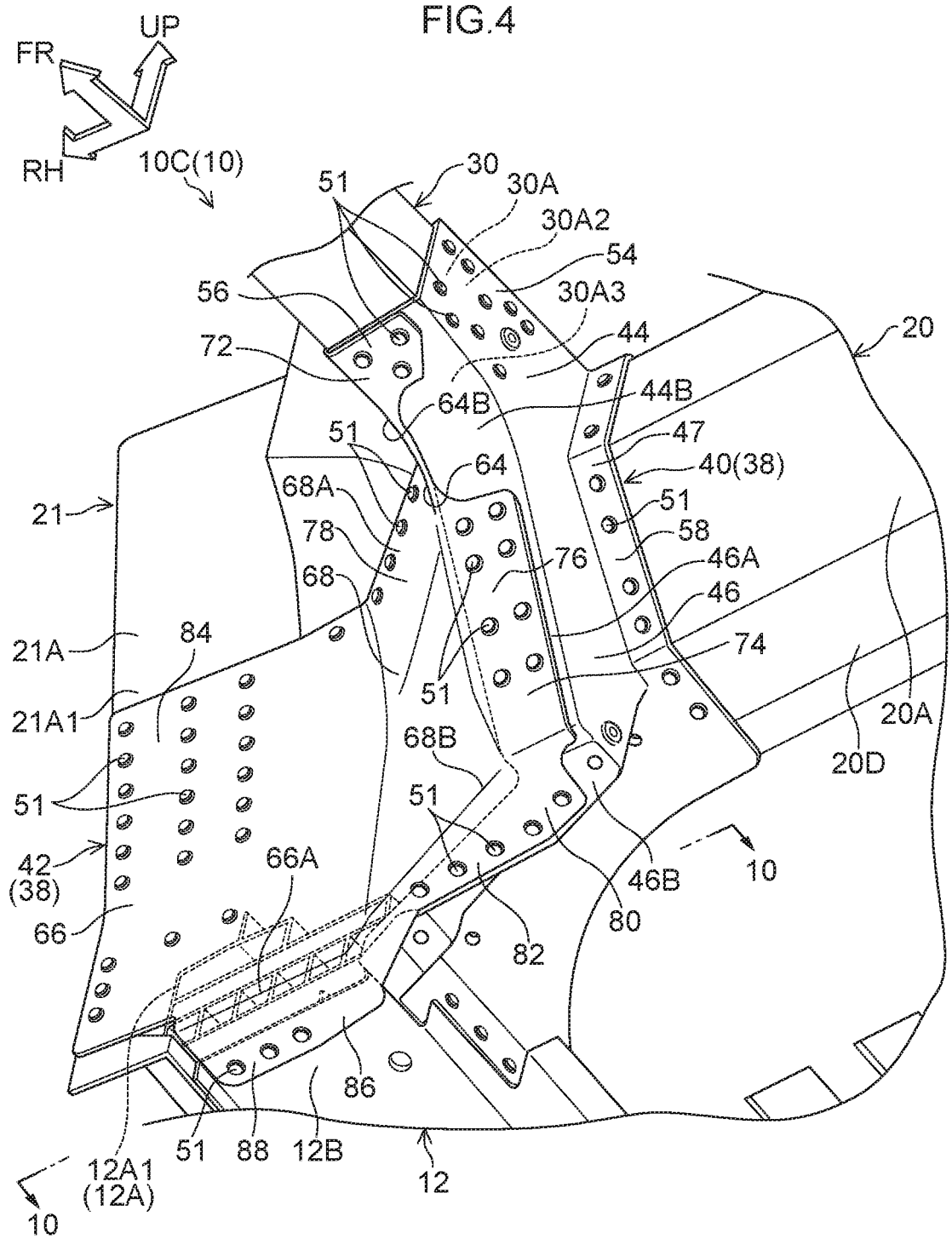
FIG. 4 is a perspective view, viewed diagonally from the front-left side of the lower side, of the front portion of the vehicle in which the vehicle front portion structure according to the present exemplary embodiment is employed.

The inner front portion 44 is formed so as to cover a rear end portion 30A of the corresponding front side member 30 from the vehicle width direction inner side thereof. An upper wall portion 30A1, inner wall portion 30A2 and lower wall portion 30A3 of the front side member 30 (see FIG. 4) are joined (at join portions 52, 54 and 56 (see FIG. 4)) via joining members 51 that are, for example, FDS or the like. FIG. 4 depicts a perspective view in which the front portion 10C of the vehicle body 10 is viewed diagonally from the front-left side of the lower side thereof. In the descriptions below, where the joining members 51 are used at join portions, descriptions thereof are not given except where particularly needed.

The inner lower portion 46 extends from the rear end of the front side member 30 in a direction that is angled to the lower side towards the vehicle rear side. The inner lower portion 46 is formed in a chamber shape in a sectional view cut along directions orthogonal to a length direction thereof (the vertical and left-and-right directions). The inner lower portion 46 constitutes a portion of the framework of the front portion 10C of the vehicle body 10.

Figure 5:
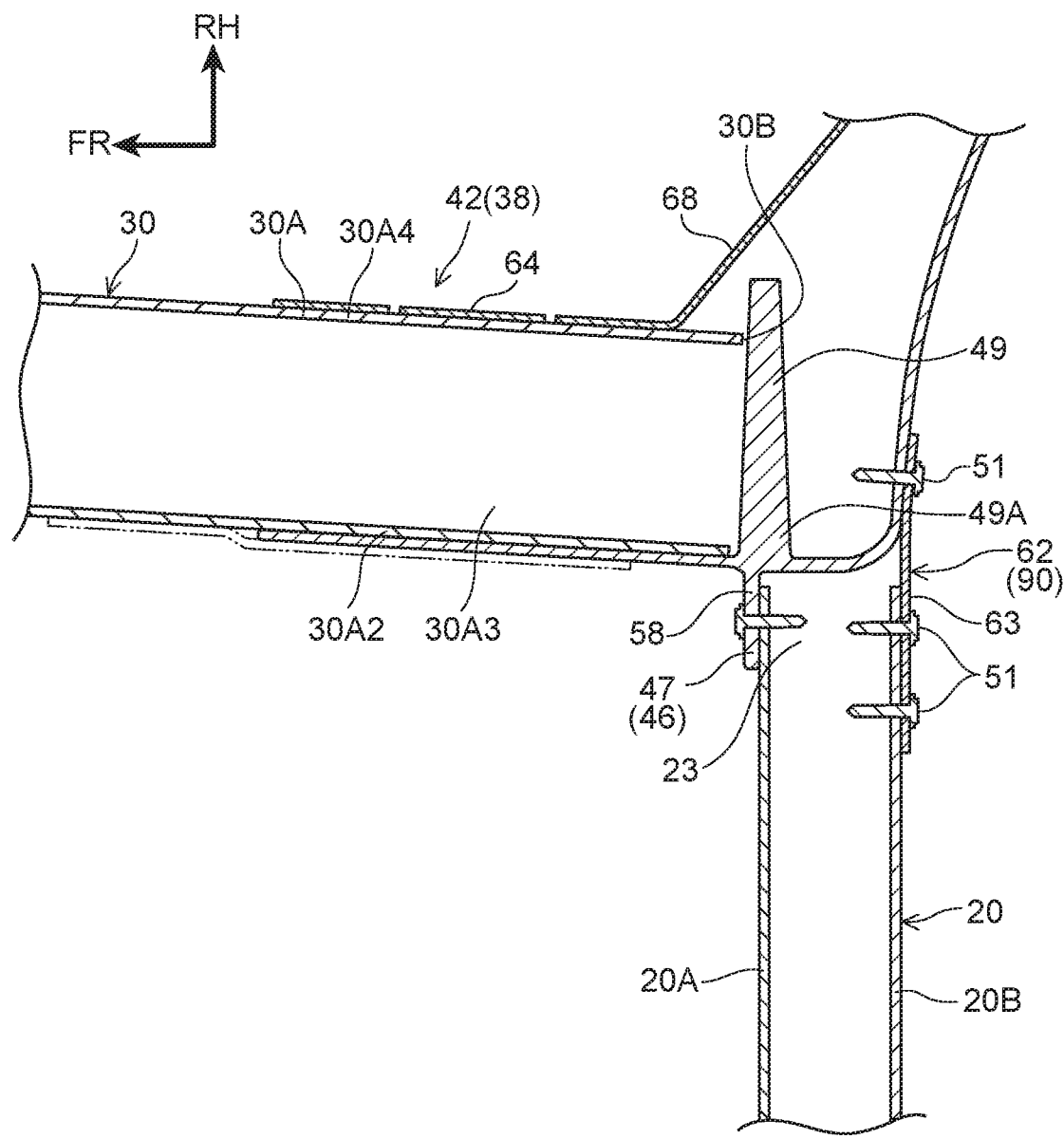
FIG. 5 is a sectional diagram showing a dash cross-member and the like cut along line 5-5 in FIG. 2.

As shown in FIG. 5, the dash cross-member 20 is provided with a front wall portion 20A and a rear wall portion 20B. The front wall portion 20A is arranged in the vertical and left-and-right directions. The rear wall portion 20B is disposed to the rear side of the front wall portion 20A and arranged to be substantially parallel with the front wall portion 20A. FIG. 5 depicts a sectional view of the dash cross-member 20 and the like cut along line 5-5 shown in FIG. 2.

Figure 6:
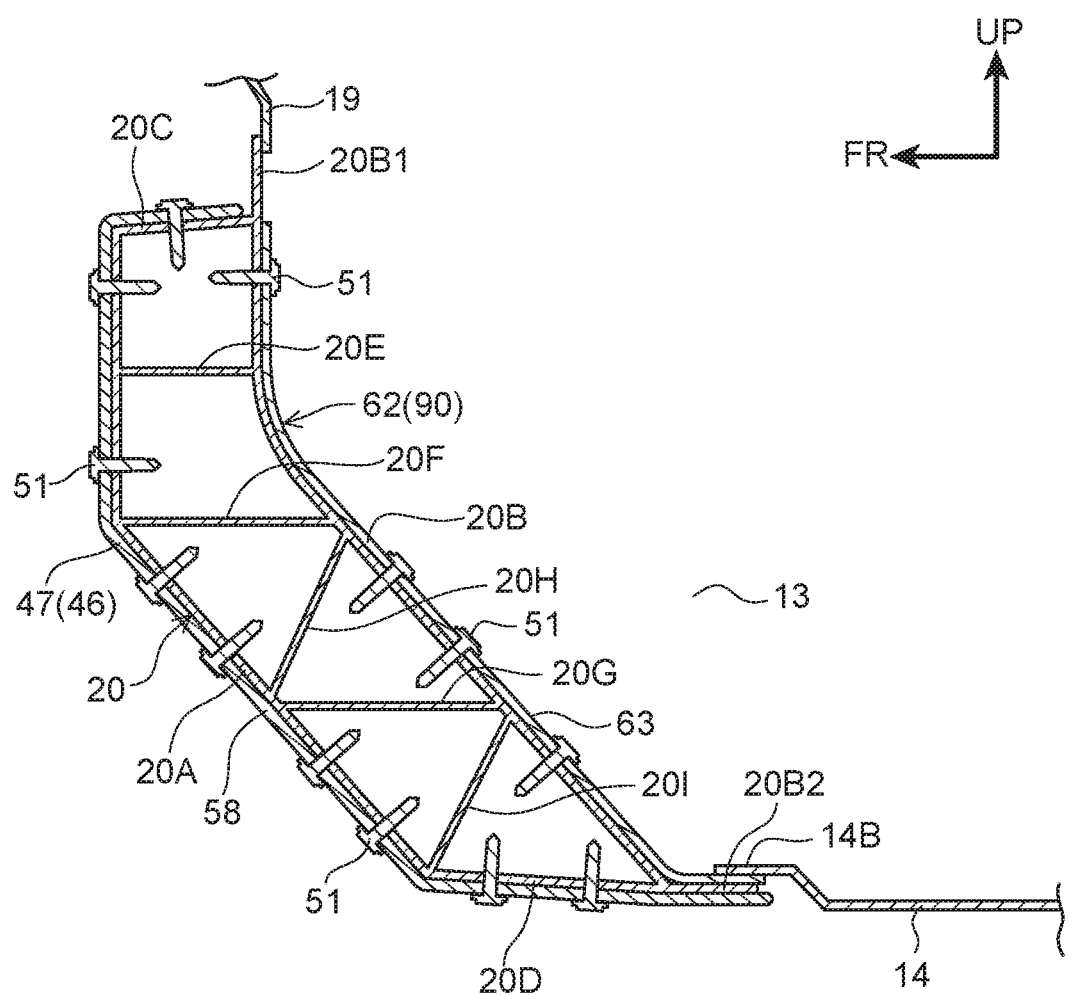
FIG. 6 is a sectional diagram showing the dash cross-member and the like cut along line 6-6 in FIG. 1.

FIG. 6 depicts a sectional view of the dash cross-member 20 and the like cut along line 6-6 in FIG. 1. As shown in FIG. 6, an upper wall portion 20C that links the upper end of the front wall portion 20A with the rear wall portion 20B is provided extending substantially horizontally from the upper end of the front wall portion 20A to the side thereof at which the rear wall portion 20B is disposed. An upper end portion 20B1 of the rear wall portion 20B of the dash cross-member 20 extends upward from the upper wall portion 20C and is joined to a dash panel 19, which separates the passenger compartment 13 from a power unit compartment (a space in which a motor and the like are disposed).

A lower well portion 20D that links the lower end of the front wall portion 20A with the rear wall portion 20B is provided extending substantially horizontally from the lower end of the front wall portion 20A to the side thereof at which the rear wall portion 20B is disposed. A lower end portion 20B2 of the rear wall portion 20B of the dash cross-member 20 extends to the vehicle rear side from the lower wall portion 20D. A front end portion 14B of the floor panel 14 may be joined to the lower end portion 20B2.

Ribs 20E, 20F and 20G span between the front wall portion 20A and the rear wall portion 20B. The ribs 20E, 20F and 20G are arranged between the upper wall portion 20C and the lower wall portion 20D to be substantially parallel with the upper wall portion 20C and the lower wall portion 20D, and are spaced apart from one another. An angled rib 20H is provided between the rib 20F and the rib 20G. The angled rib 20H is angled to the vehicle front side toward the lower side. Similarly to the angled rib 20H, an angled rib 20I is provided between the rib 20G and the lower wall portion 20D. The angled rib 20I is angled to the vehicle front side toward the lower side. Stiffness of the dash cross-member 20 is raised by these ribs.

As shown in FIG. 3 and FIG. 4, the inner lower portion 46 is formed so as to cover the dash cross-member 20 from the lower side thereof. An inner flange portion 47 is formed at the vehicle width direction inner side of the inner lower portion 46. The inner flange portion 47 is joined (at a join portion 58) to the front wall portion 20A and lower wall portion 20D of the dash cross-member 20.

As shown in FIG. 2, the inner rear portion 50 matches up with the shape of the rocker 12. The inner rear portion 50 is formed so as to cover the front end portion 12A of the rocker 12 from the upper side thereof and the passenger compartment 13 side thereof. The inner rear portion 50 is joined (at a join portion 60) to the passenger compartment 13 side of the rocker 12.

The inner middle portion 48 links the inner front portion 44 with the inner rear portion 50. The inner middle portion 48 is formed so as to cover the lower portion 21A of the front pillar 21 and an end portion 23 of the dash cross-member 20 from the upper side thereof. As shown in FIG. 5, an abutment portion 49 is formed in the vertical and left-and-right directions at the inner middle portion 48, at the side thereof at which a rear end 30B of the front side member 30 is disposed. The rear end 30B of the front side member 30 may abut against the abutment portion 49. The abutment portion 49 has greater thickness than other portions of the inner member 40. Therefore, during a vehicle front collision, when an impact load is applied to the front side member 30 and the rear end 30B of the front side member 30 abuts against the abutment portion 49, movement of the front side member 30 to the vehicle rear side may be suppressed.

The inner middle portion 48 extends to the vehicle rear side from a root portion 49A of the abutment portion 49, and curves toward the vehicle width direction outer side at substantially the same position in the vehicle front-and-rear direction as the rear wall portion 20B of the dash cross-member 20. That is, in a substantial plan view, the inner middle portion 48 extends in the vehicle width direction in a state of being substantially coplanar with the rear wall portion 20B of the dash cross-member 20. As shown in FIG. 2, the inner middle portion 48 includes a circular arc portion 48A that is formed in a circular arc shape bulging to the vehicle front side. An upper flange portion 48B is formed at an upper end portion of the circular arc portion 48A, and an outer flange portion 48C is formed at an outer edge portion of the circular arc portion 48A. The upper flange portion 48B and outer flange portion 48C are each joined to the front pillar 21 (at join portions 61).

In the present exemplary embodiment, as shown in FIG. 2 and FIG. 5, a reinforcing plate 62 (a reinforcing member and reinforcing portion) with a substantially rectangular shape is disposed between the inner middle portion 48 of the connecting member 38 and the rear wall portion 20B of the dash cross-member 20 so as to span therebetween in the left-and-right direction. The reinforcing plate 62 is a wrought member formed by press working. As shown in FIG. 6, the reinforcing plate 62 is specified with substantially the same height dimension as the rear wall portion 20B of the dash cross-member 20. The reinforcing plate 62 is joined (at a join portion 63) to the inner middle portion 48 and the rear wall portion 20B of the dash cross-member 20 via the joining members 51.

In the present exemplary embodiment, an upper end of the reinforcing plate 62 is specified to be lower than the rear wall portion 20B of the dash cross-member 20 by the joining relationship between the rear wall portion 20B of the dash cross-member 20 and the dash panel 19. That is, the reinforcing plate 62 is specified with a length within a range so as not to interfere with other members.

—Outer Member—

As shown in FIG. 2 and FIG. 3, the outer member 42 is a plate-shaped wrought member of an aluminium alloy formed by pressing. The outer member 42 includes an outer side wall portion 64, a front wall portion 66 and an angled wall portion 68.

The outer side wall portion 64 of the outer member 42 is formed so as to cover an outer wall portion 30A4 of the rear end portion 30A of the front side member 30 from the vehicle width direction outer side thereof (see FIG. 5). An upper end portion 64A of the outer side wall portion 64 is joined (at a join portion 70) to an upper flange portion 44A that is formed at the inner front portion 44 of the inner member 40.

As shown in FIG. 4, a superposed portion 72 extends from a lower end 64B of the outer side wall portion 64. The superposed portion 72 is bent back toward the vehicle width direction inner side along a lower wall portion 44B of the inner front portion 44. The superposed portion 72 is superposed with the lower wall portion 44B of the inner front portion 44 and joined (at the aforementioned join portion 56) to the lower wall portion 44B via the joining members 51.

A superposed portion 74 extends from the lower end 64B of the outer side wall portion 64, separately from the superposed portion 72. The superposed portion 74 is bent back toward the vehicle width direction inner side along a lower wall portion 46A of the inner lower portion 46. The superposed portion 74 is superposed with the lower wall portion 46A of the inner lower portion 46 and joined (at a join portion 76) to the lower wall portion 46A via the joining members 51.

An upper flange portion 48D is formed at an upper end portion of the inner middle portion 48 of the inner member 40. As shown in FIG. 2 and FIG. 4, an upper end portion 68A of the angled wall portion 68 of the outer member 42 is joined (at a join portion 78) to the upper flange portion 48D. A superposed portion 80 (a second superposed portion and reinforcing portion) extends from a lower end 68B of the angled wall portion 68. The superposed portion 80 is bent back toward the rear side along a bottom wall portion 46B of the inner lower portion 46. The superposed portion 80 is superposed with the bottom wall portion 46B of the inner lower portion 46 and joined (at a join portion 82) to the bottom wall portion 46B via the joining members 51.

The front wall portion 66 of the outer member 42 is joined (at a join portion 84) to a front wall portion 21A1 of the lower portion 21A of the front pillar 21 so as to cover a front end 12A1 of the rocker 12 from the front side thereof. A superposed portion 86 (a first superposed portion and reinforcing portion) extends from a lower end 66A of the front wall portion 66. The superposed portion 86 is bent back toward the rear side along a lower wall portion 12B of the rocker 12. The superposed portion 86 is superposed with the lower wall portion 12B of the rocker 12 and joined thereto via the joining members 51 (at the join portion 88).

—Operation and Effects of the Present Exemplary Embodiment—

Now, operation and effects of the vehicle front portion structure according to the present exemplary embodiment are described.

In the present exemplary embodiment, as shown in FIG. 2 and FIG. 3, the front side member 30, the dash cross-member 20 and the rocker 12 are linked by the connecting member 38. At least a portion of the connecting member 38 is formed by die-casting. A reinforcing portion 90 is formed at the connecting member 38, at a region thereof on which a tensile load acts when an impact load is transmitted from the front side member 30 during a vehicle front collision. The reinforcing portion 90 reinforces this region.

Typically, an aluminium alloy has high strength and low weight, and is therefore superior to alternative metals. As mentioned above, a member that is formed by extrusion molding, press working or the like is referred to as a wrought member, and a member that is formed by die-casting is referred to as a cast member. In a cast member, due to the effect of blowholes formed during casting and suchlike, extension is not allowed when a tension load is applied, and a strain amount before breakage is small. Thus, a withstand load with respect to tensile loads is low.

For example, FIG. 7A and FIG. 7B depict operation description diagrams schematically showing a front portion 102 of a vehicle body 100 that serves as a comparative example. A connecting member 104 that is formed integrally by die-casting is shown. When an impact load f is applied to the front portion 102 of the vehicle body 100 during a vehicle front collision, the impact load f is transmitted from a front side member 106 to a dash cross-member 108.

The front side member 106 extends in the vehicle front-and-rear direction, and the dash cross-member 108 extends in the vehicle width direction. Therefore, as shown in FIG. 7A, when the impact load f is transmitted from the front side member 106 to the connecting member 104 during, the vehicle front collision, the impact load f is transmitted through the connecting member 104 at the side of the dash cross-member 108 at which an end portion 108A is provided. The connecting member 104 is joined to the dash cross-member 108 at a join portion 112. The connecting member 104 is also joined to a rocker 110. Therefore, as illustrated in FIG. 7B, a tensile load acts via the end portion 108A of the dash cross-member 108 on a rear portion 112A of the join portion 112. Consequently, there is a possibility of the join portion 112 breaking.

In the present exemplary embodiment, by contrast, as shown in FIG. 2 and FIG. 5, the reinforcing plate 62, which serves as the reinforcing portion 90, is disposed so as to span in the left-and-right direction between the inner middle portion 48 of the inner member 40, which constitutes a portion of the connecting member 38, and the rear wall portion 20B of the dash cross-member 20.

The reinforcing plate 62 is a wrought member formed by press working. The reinforcing plate 62 is joined (at the join portion 63) to both the inner middle portion 48 of the inner member 40 of the connecting member 38 and the rear wall portion 20B of the dash cross-member 20. Because a wrought member has high tensile strength, when the reinforcing plate 62 is provided at the join portion 63 with the connecting member 38 and the dash cross-member 20, the join portion 63 is reinforced by the reinforcing plate 62, and a tensile load acting on the join portion 63 may be borne by the reinforcing plate 62. Consequently, in the present exemplary embodiment, breakage of the connecting member 38 may be suppressed.

Therefore, in the present exemplary embodiment, as illustrated in FIG. 8A and FIG. 8B, an impact load F that is transmitted from the front side member 30 may be transmitted to the dash cross-member 20, the rocker 12 and the like via the connecting member 38. FIG. 8A and FIG. 8B depict operation description diagrams schematically showing the front portion 10C of the vehicle body 10 according to the present exemplary embodiment.

As shown in FIG. 8A, the impact load F is transmitted from the connecting member 38 to the side of the dash cross-member 20 at which the end portion 23 is provided. As shown in FIG. 8B, the impact load F is then transmitted from the side of the dash cross-member 20 at which the end portion 23 is provided to the side of the dash cross-member 20 at which an end portion 25 is provided, and is transmitted (as a transmitted load F1) through the connecting member 38 that is at the opposite side of the vehicle body 10 to the rocker 12 at the opposite side of the vehicle body 10. Meanwhile, the impact load F that is transmitted from the connecting member 38 to the rocker 12 is transmitted (as a transmitted load F2) to the vehicle rear side along the direction of extension of the rocker 12 (the vehicle front-and-rear direction.

Thus, in the present exemplary embodiment, breakage of the connecting member 38 is suppressed, and the impact load F that is transmitted from the front side member 30 may be transmitted through the connecting member 38 to the dash cross-member 20, the rocker 12 and the like.

As shown in FIG. 2 and FIG. 3, in the present exemplary embodiment, the connecting member 38 includes the inner member 40 and the outer member 42. That is, in the present exemplary embodiment, the connecting member 38 is structured by plural members. Therefore, freedom of design may be broadened compared to a case in which the connecting member 38 is formed by a single member.

In the present exemplary embodiment, the outer member 42 that constitutes a portion of the connecting member 38 is formed of a plate-shaped wrought member that is formed by pressing. Because a wrought member has a high tensile strength, tensile strength of the connecting member 38 may be raised compared to, as an example that is not shown in the drawings, a structure in which the inner member 40 and outer member 42 constituting the connecting member 38 are formed of cast members.

FIG. 9 depicts a plan view schematically showing the front portion 10C of the vehicle body 10 according to the present exemplary embodiment. As shown in FIG. 9, the rocker 12 extends in the vehicle front-and-rear direction at the vehicle rear side and vehicle width direction outer side of the front side member 30. Therefore, when an impact load F is transmitted from the front side member 30 to the connecting member 38 during a vehicle front collision, a bending moment M in a horizontal direction acts on the connecting member 38 that is joined to the front side member 30 and the rocker 12. At this time, compressive stress (arrows A) acts on the rear portion 38A of the connecting member 38, and tensile stress (arrows B) acts on the front portion 38B of the connecting member 38.

In the present exemplary embodiment, the inner member 40 that includes the rear portion 38A of the connecting member 38 and the outer member 42 that includes the front portion 38B of the connecting member 38 are provided. That is, the compressive stress (arrows A) acts on the inner member 40 of the connecting member 38 and the tensile stress (arrows B) acts on the outer member 42 of the connecting member 38.

In light of this point, in the present exemplary embodiment, because the outer member 42 of the connecting member 38 is formed by a wrought member with a high tensile strength, breakage of the connecting member 38 may be suppressed. Consequently, in the present exemplary embodiment, an impact load F that is transmitted from the front side member 30 may be transmitted through the connecting member 38 to the dash cross-member 20, the rocker 12 and the like.

In the present exemplary embodiment, as shown in FIG. 4, the superposed portion 86, which serves as the reinforcing portion 90, extends from the lower end 66A of the front wall portion 66 of the outer member 42 of the connecting member 38 and wraps round the lower wall portion 12B of the rocker 12. The superposed portion 86 is superposed with the lower wall portion 12B of the rocker 12 and joined thereto via the joining members 51 (at the join portion 88).

Figure 12:
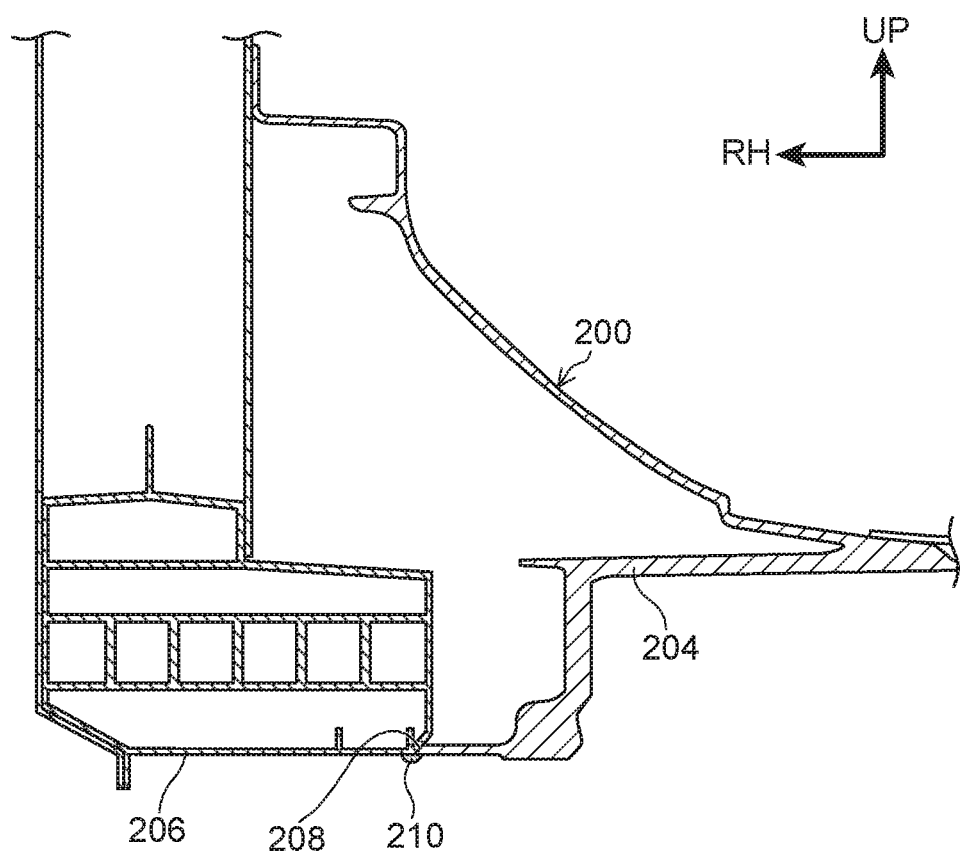
FIG. 12 is a sectional diagram showing a rocker, a connecting member and the like cut along line 12-12 in FIG. 11.

As an example, a comparative example is shown in FIG. 11 and FIG. 12. At a connecting member 200, an outer member 202 formed of a wrought member is abutted (at an abutting portion 208) against an inner member 204, a rocker 206 and the like, and the abutting portion 208 is welded (a welding portion 210). In this structure, if the welding portion 210 detaches when a tensile load acts on the connecting member 200, the connecting member 200 becomes unable to transmit an impact load f to the rocker 206. FIG. 11 is a perspective view, viewed diagonally from the front-left side of the lower side, of a front portion 214 of a vehicle 212. FIG. 12 is a sectional diagram showing the rocker 206, connecting member 200 and the like cut along line 12-12 in FIG. 11.

In the present exemplary embodiment, by contrast, as shown in FIG. 4 and FIG. 10, the superposed portion 86 that extends from the lower end 66A is provided at the front wall portion 66 of the outer member 42 of the connecting member 38, and the superposed portion 86 is superposed with the lower wall portion 12B of the rocker 12 and joined thereto (at the join portion 88) via the joining members 51. FIG. 10 is a sectional diagram showing the rocker 12, the connecting member 38 and the like cut along line 10-10 in FIG. 4.

Because this superposed portion 86 is formed at the front wall portion 66 of the outer member 42 in the present exemplary embodiment, a portion of a tensile load acting on the connecting member 38 may be borne by the superposed portion 86. Therefore, in the present exemplary embodiment, breakage of the join portion 88 between the outer member 42 of the connecting member 38 and the rocker 12 may be suppressed and, as shown in FIG. 8B, an impact load F transmitted to the connecting member 38 may be transmitted to the rocker 12 (as a transmitted load F2).

As shown in FIG. 4, in the present exemplary embodiment the superposed portion 86 is superposed with and joined to the lower wall portion 12B of the rocker 12 in a state in which the superposed portion 86 is bent back toward the rear side along the lower wall portion 12B of the rocker 12. Therefore, in the present exemplary embodiment, air resistance during running of the vehicle may be reduced and aerodynamic performance improved compared to, as an example that is not shown in the drawings, a structure in which a join portion between the outer member 42 of the connecting member 38 and the rocker 12 is a flange portion formed along the vertical direction.

In the present exemplary embodiment, the superposed portion 80, which serves as the reinforcing portion 90, extends from the lower end 68B of the angled wall portion 68 of the outer member 42 of the connecting member 38 and wraps round the bottom wall portion 46B of the inner lower portion 46 of the inner member 40 that is joined to the front side member 30 and the dash cross-member 20. The superposed portion 80 is superposed with the bottom wall portion 46B of the inner lower portion 46 and joined thereto (at the join portion 82) via the joining members 51.

Thus, in the present exemplary embodiment, because the superposed portion 80 is formed at the front wall portion 66 of the outer member 42, similarly to the superposed portion 86, a portion of a tensile load acting on the connecting member 38 may be borne by the superposed portion 80. Therefore, in the present exemplary embodiment, breakage of the join portion 82 between the outer member 42 of the connecting member 38 and the inner lower portion 46 of the inner member 40 may be suppressed and, as shown in FIG. 8B, an impact load F transmitted to the connecting member 38 may be transmitted (as a transmitted load F1) to the dash cross-member 20, the rocker 12 and the like.

As shown in FIG. 4, in the present exemplary embodiment the superposed portion 80 is superposed with and joined to the bottom wall portion 46B of the inner lower portion 46 in a state in which the superposed portion 80 is bent back toward the rear side along the bottom wall portion 46B of the inner lower portion 46. Therefore, in the present exemplary embodiment, aerodynamic performance during running of the vehicle may be improved as described above.

In the present exemplary embodiment, the connecting member 38 includes the inner member 40 formed of a cast member and the outer member 42 formed of a wrought member, but this is not limiting. For example, although not shown in the drawings, the connecting member may be formed by a single member. In this case the entire connecting member is formed of a cast member. Further, when the connecting member 38 includes the inner member 40 and the outer member 42, the inner member 40 and the outer member 42 may be formed by cast members in these structures, the reinforcing plate 62 formed of a wrought member should be provided at the join portion 63 with the connecting member 38 and the dash cross-member 20.

In the present exemplary embodiment, an example is described in which the materials forming the connecting member 38, the front side member 30, the dash cross-member 20 and the rocker 12 are aluminium alloys, but the present disclosure is not limited thus. The materials of these members are not necessarily limited to being aluminium alloys. For example, alternative light metals such as magnesium alloys and the like may be used.

An exemplary embodiment of the present disclosure is described here above. However, the present disclosure is not limited by these descriptions and it will be clear that numerous modifications beyond these descriptions may be embodied within a technical scope not departing from the gist of the present disclosure.

What is claimed is:

1. A vehicle front portion structure comprising:
    a front side member that extends in a vehicle front-and-rear direction, at a front portion of the vehicle;
    a dash cross-member that extends in a vehicle width direction, at the vehicle rear side of the front side member;
    a rocker that extends in the vehicle front-and-rear direction, at the vehicle rear side and at a vehicle width direction outer side of the front side member;
    a connecting member that is joined to the front side member, the dash cross-member and the rocker, at least a portion of the connecting member being a cast member; and
    a reinforcing portion that is provided at a region of the connecting member at which a tensile load acts when an impact load is transmitted from the front side member to the connecting member during a front collision of the vehicle, the reinforcing portion reinforcing this region.

2. The vehicle front portion structure according to claim 1, wherein the reinforcing portion includes a reinforcing member that is disposed at the vehicle rear side of a join portion at which the connecting member is joined to the dash cross-member, the reinforcing member being a wrought member.

3. The vehicle front portion structure according to claim 1, wherein the connecting member includes:
    an inner portion that includes a vehicle front-and-rear direction rear portion of the connecting member; and
    an outer portion that includes a vehicle front-and-rear direction front portion of the connecting member, the outer portion being joined to the inner portion.

4. The vehicle front portion structure according to claim 2, wherein the connecting member includes:
   an inner portion that includes a vehicle front-and-rear direction rear portion of the connecting member; and
   an outer portion that includes a vehicle front-and-rear direction front portion of the connecting member, the outer portion being joined to the inner portion.

5. The vehicle front portion structure according to claim 3, wherein the reinforcing portion includes the outer portion, the outer portion being a wrought member.

6. The vehicle front portion structure according to claim 4, wherein the reinforcing portion includes the outer portion, the outer portion being a wrought member.

7. The vehicle front portion structure according to claim 5, wherein:
   the outer portion is joined to the rocker, and
   the reinforcing portion includes a first superposed portion that is formed at a lower end portion of the outer portion, is bent back toward the vehicle front-and-rear direction rear side along a lower wall portion of the rocker, and is joined to the rocker via a joining member.

8. The vehicle front portion structure according to claim 6, wherein:
   the outer portion is joined to the rocker, and
   the reinforcing portion includes a first superposed portion that is formed at a lower end portion of the outer portion, is bent back toward the vehicle front-and-rear direction rear side along a lower wall portion of the rocker, and is joined to the rocker via a joining member.

9. The vehicle front portion structure according to claim 5, wherein:
   the inner portion is joined to the front side member and the dash cross-member, and
   the reinforcing portion includes a second superposed portion that is formed at a lower end portion of the outer portion, is bent back toward the vehicle front-and-rear direction rear side along a lower wall portion of the inner portion joined to the front side member and the dash cross-member, and is joined to the inner portion via a joining member.

10. The vehicle front portion structure according to claim 6, wherein:
    the inner portion is joined to the front side member and the dash cross-member, and
    the reinforcing portion includes a second superposed portion that is formed at a lower end portion of the outer portion, is bent back toward the vehicle front-and-rear direction rear side along a lower wall portion of the inner portion joined to the front side member and the dash cross-member, and is joined to the inner portion via a joining member.

11. The vehicle front portion structure according to claim 7, wherein:
    the inner portion is joined to the front side member and the dash cross-member, and
    the reinforcing portion includes a second superposed portion that is formed at a lower end portion of the outer portion, is bent back toward the vehicle front-and-rear direction rear side along a lower wall portion of the inner portion joined to the front side member and the dash cross-member, and is joined to the inner portion via a joining member.

12. The vehicle front portion structure according to claim 8, wherein:
    the inner portion is joined to the front side member and the dash cross-member, and
    the reinforcing portion includes a second superposed portion that is formed at a lower end portion of the outer portion, is bent back toward the vehicle front-and-rear direction rear side along a lower wall portion of the inner portion joined to the front side member and the dash cross-member, and is joined to the inner portion via a joining member.

\* \* \* \* \*